March 20, 1945. A. C. KOETT 2,372,006
CHUCK
Filed Sept. 3, 1942 2 Sheets-Sheet 1

INVENTOR.
Albert C. Koett
BY Wood, Arey, Herron & Evans
Attorneys.

March 20, 1945.           A. C. KOETT           2,372,006
CHUCK
Filed Sept. 3, 1942           2 Sheets-Sheet 2
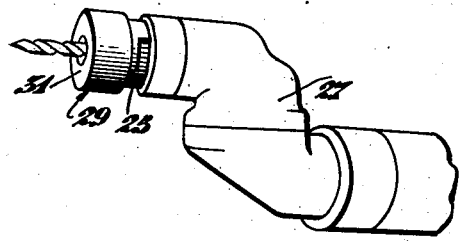
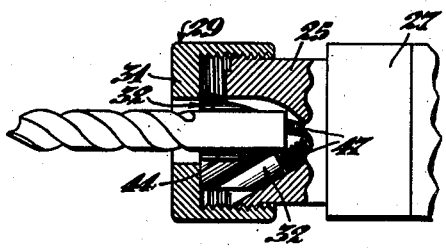
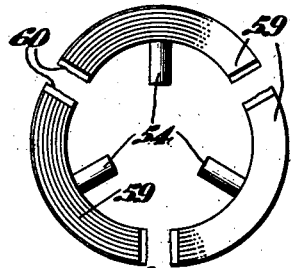
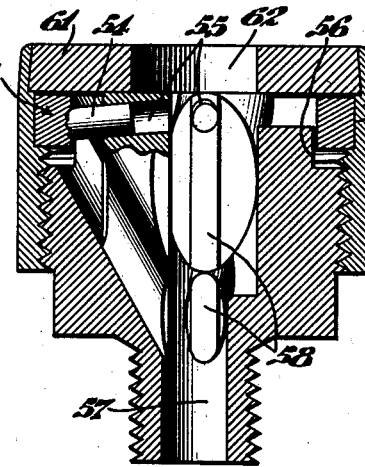
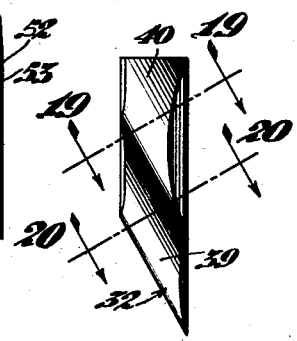
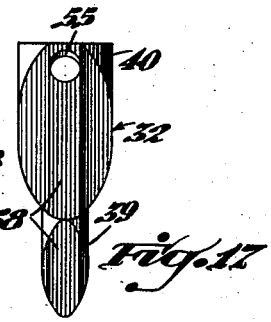
INVENTOR.
Albert C. Koett
BY Wood, Arey, Herron & Evans
Attorneys.

Patented Mar. 20, 1945

2,372,006

UNITED STATES PATENT OFFICE 2,372,006

CHUCK

Albert C. Koett, Cincinnati, Ohio, assignor to The Kett Tool Company, Cincinnati, Ohio, a corporation of Ohio Application September 3, 1942, Serial No. 457,164

4 Claims. (Cl. 279—64)

This invention relates to a new and improved chuck for holding a drill or other tool of the type having a spindle or shank. More particularly, the invention relates to improvements in that type of chuck employing slidable jaws adapted to converge upon the shank of the tool for centering and gripping it on a driving axis.

It has been an object of the present inventor to provide a simple and compact chuck of this type which is readily adaptable for use with a portable driving means and which takes up very little space at the driving end of the driving means and can therefore be manipulated in very close quarters.

It has been a still further object of the present inventor to provide a chuck in which the overall axial length of the chuck assembly has been greatly reduced over that of previous chucks and yet wherein the gripping jaws have sufficient bearing contact to provide for efficient gripping and centering actions. In fact, the present inventor has provided, within a very small space, a maximum amount of guiding contact for each jaw in relation to the chuck body.

It has been a still further object of the present inventor to provide an arrangement of gripping jaws wherein, in spite of the compactness of the chuck, tools having a wide range of shank diameters may be gripped. The jaws are so constructed that the very smallest drill may be effectively held and centered.

It has been a further object of the present inventor to provide an improved actuating means for the clutch jaws as well as an efficient arrangement of means for retracting the jaws from clamping position.

Other objects and certain advantages will be more fully apparent from a description of the drawings in which:

Figure 9 is a general view showing the chuck applied to a driving instrumentality.

Figure 10 is a view taken similar to Figure 3 but showing a drill held in the chuck.

Figure 11 is a sectional view taken through a chuck of modified construction from that shown in Figure 3.

Figure 12 is a top plan view of the chuck body for the modified chuck.

Figure 13 is a sectional view taken on line 13—13 Figure 12, detailing the internal structure of the modified chuck body.

Figure 14 is a side view of the actuator ring for the chuck of Figure 11.

Figure 15 is a top plan view of the disassembled actuator ring.

Figure 16 is a side view of a chuck jaw for the modified form.

Figure 17 is an inner view of the jaw of Figure 16.

Figure 18 is a top plan view of the last named jaw.

Figure 19 is a sectional view taken on line 19—19, Figure 16.

Figure 20 is a sectional view taken on line 20—20, Figure 16.

Figure 1:
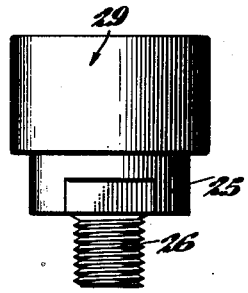
Figure 1 is an external view of the chuck showing it separate and apart from the driving means.
Figure 2:
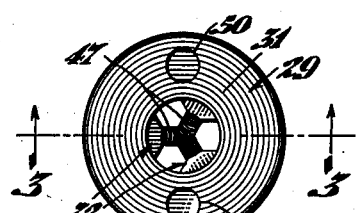
Figure 2 is a top plan view of the chuck showing the jaws in opened condition.
Figure 3:
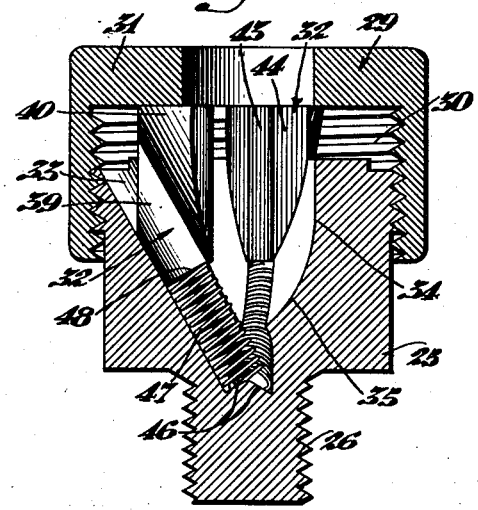
Figure 3 is an enlarged sectional view taken on line 3—3 Figure 2, showing the details of the jaws and actuating means.

The embodiment of the invention disclosed here incorporates a body, clamping jaws, and the actuating means. In one form, springs are used to retract the jaws and in the other, the jaws are carried back or retracted from the actuator ring.

Referring to the drawings, the body is indicated at 25. The body is cylindrical and includes a screw-threaded stud 26 extending axially from the end of the chuck to be attached to the driving medium. As shown in Figure 9, the chuck is attached to the drive shaft extending from an adjustable extension 27 of the driving motor. The other end of the body from the end having the stud is externally screw-threaded to receive the actuator sleeve 29. The actuator sleeve is internally threaded as at 30 and provides an overhanging flange 31 adapted to engage the outer ends of the clamping jaws 32. The bore of the chuck body which receives the jaws is of a special internal configuration for receiving the jaws and providing substantial guiding and bearing surfaces for the jaws.

Figure 4:
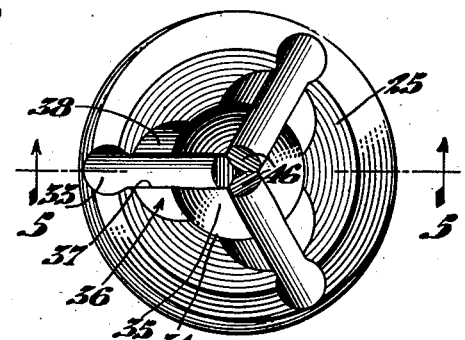
Figure 4 is a top plan view of a chuck body with the chuck jaws and actuator removed.
Figure 5:
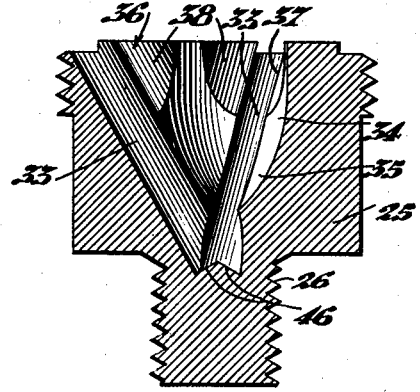
Figure 5 is a sectional view taken on line 5—5 showing the details of the chuck body shown in Figure 4.
Figure 6:
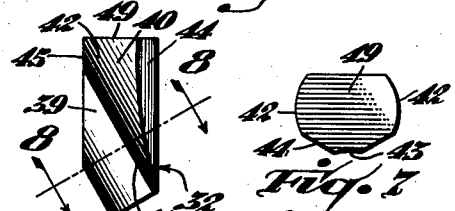
Figure 6 is a side view of one of the chuck jaws.
Figure 7:
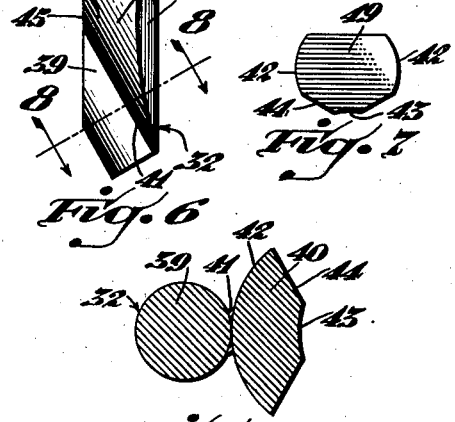
Figure 7 is a top plan view thereof.

Three jaws are employed and the guideway is the same for each. For each guideway a small bore 33 (see Figures 4 and 5) extends angularly from the outer edge of the top of the body to its axis. These bores converge upon the axis substantially at the base of the body but within the stud portion. A central bore 34 is provided which has a curved bottom as indicated at 35, this bore being disposed on the central axis. Just inside each of the angular bores, larger bores result in the curved walls 36. These bores 36 overlap the smaller bores 33 so that the bores are connected through a passageway 37. The bores 33 and 36 are parallel so that the bores 36, converging into the central bore, leave only the wall portions indicated at 38.

It has been thought more descriptive to refer to these guides as a result of boring, although this need not be the method employed in forming them. Since the inner bores 36 barely overlap the bores 33, the passageways 37 are relatively narrow as opposed to the diameter of the bores 33.

Figure 8:
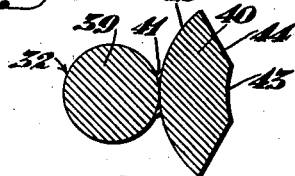
Figure 8 is a sectional view taken on line 8—8 of Figure 6 showing the sectional contour of the jaw.

Each jaw element is composed of two sections and may be made of two pieces 39 and 40 held together by welding 41 (Figure 8). The outer portion is round and fits in the bore 33. The inner portion is arcuate and provides a semicircular surface 42 lying against the surfaces 38—38. The inner surface of the jaw is curved as at 43 and is disposed in parallelism with the central axis of the body. The surfaces 44 at either side of the curved central portion 43 are angularly disposed and will abut with those of the adjacent jaws when the jaws are brought into abutment as when the chuck actuator is completely screwed down. The outer surface of the assembled jaw, indicated at 45, is straight and is parallel with the inner surface, this being arranged so that the jaws will clear the actuator. Where the bores 33 come together on the axis of the body, bottom surfaces 46 are provided at right angles to the axes of the bores. Coil springs 47 are disposed under compression between these bottoms and the lower surfaces of the jaws 48, which surfaces are also disposed at right angles to the axes of the bores. As stated, the actuator contacts the flat tops 49 of the jaws. The overhanging flange 31 includes apertures 50 disposed diametrically opposite which apertures are adapted to receive a spanner wrench for tightening or loosening the actuator.

Thus, it will be apparent that the jaws have an extending bearing surface despite the smallness and compactness of their assembly. Their flared inner portions, as represented by the inner sections 42, have contact, over an extended area, with the surfaces 38—38. Moreover, the guiding of the jaws is extremely efficient. They are held against tipping due to the fact that they extend between the narrow openings between the bores 33 and 36. They cannot tip inwardly nor can they rock laterally. The jaws are easily assembled merely by dropping the springs in the bores and inserting the jaws in on top of the springs with subsequent attachment of the actuator by screwing it upon the body.

In the modified form of the invention, there is one difference over the structure just described, and this difference resides in the manner in which the jaws are retracted. The springs are eliminated. Instead, a retracting ring 51 is incorporated. The actuating sleeve 52 of this form is screwed upon the jaw in the same manner as in the preceding form. The retracting ring 51 is mounted within a counter-turned portion 53 within the top of the sleeve.

This ring 51 includes inwardly radially extending studs 54 which project into bores 55 of the upper ends of the jaws. The studs and bores have their axes disposed at an angle tilted slightly upwardly toward the central axis of the body. The jaws are slidable on the studs so as to permit inward and outward movement of the jaws as they are slid down the guideways previously described. The body is counter-turned as at 56 so as to clear the ring. Since the springs are eliminated, the central bore 57 of the body extends entirely through the stud portion 26, and the gripping faces 58 of the jaws are longer since they are not cut off at their lower ends to provide right angle seats for the springs. The shapes of the jaws vary slightly but have the same essentials as the previously described jaws, that is, the inner and outer sections as illustrated in Figures 19 and 20.

Since the jaws must be inserted into the angular guides, a special manner of assembling the ring has been provided. The ring is made in three segments 59, as shown in Figure 15. Each segment includes one of the studs 54. Each segment is individually assembled with its jaw, and when all of the sections are lying in the countersunk portion 53 of the body, the sections are welded together along the radial lines 60.

The ring is contained loosely in the body and is held against upward displacement by means of a disc 61. This disc is secured in an internal groove in the upper end of the sleeve, the attachment being accomplished by peening over the upper margin of the sleeve upon the outer circumference of the disc. This disc includes a central aperture 62 for insertion of the drill into the chuck. The disc abuts the upper ends of the jaws and provides direct contact effective for urging the jaws into clamping position when the sleeve is screwed upon the body. When the jaws are to be released, the sleeve is unscrewed and this lifts the retracting ring, pulling the jaws upwardly in their grooves.

I claim:

1. A chuck of the type described, comprising a body having inclined guideways converging upon the axis of the body from the open end of the body, said guideways in each instance consisting of radially spaced curved surfaces, the inner of which is generated on a greater radius than the outer, jaws movable in the respective guideways, said jaws being composed of sections, the outer of which is substantially completely circular and the inner of which is semicircular, a coil spring disposed under compression between the base end of each jaw and the bottom of its respective guideway, and means screwed on the body for forcing the jaws down the guideways and causing them to clamp the shank of a tool disposed on the axis of the body.

2. A chuck of the type described, comprising a circular body having inclined guideways converging upon the axis of the body from the open end of the body, said guideways in each instance consisting of radially spaced semicircular surfaces, the inner of which is generated on a greater radius than the outer, jaws movable in the respective guideways, said jaws being composed of radially spaced semicircular sections, a coil spring disposed under compression between the base end of each jaw and the bottom of its respective guideway, and means screwed on the body for forcing the jaws down the guideways and causing them to clamp the shank of a tool disposed on the axis of the body.

3. A chuck of the class described comprising, a body, a series of outer inclined bores converging at the base of the body, a series of inner bores located respectively adjacent the outer bores and spaced radially inwardly therefrom, said adjacent bores in each instance having their axes disposed in parallelism, and consisting of curved surfaces, the inner bores being generated on radii greater than the outer bores and respectively slightly overlapping the outer bores to provide a passageway between the respective adjacent bores, the center of the body within the second-named bores being open, jaws mounted in the respective bores, said bores constituting guideways for the jaws, said jaws being of cross sectional contours, fitting the cross sectional contours of the adjacent bores, and means for actuating said jaws and causing them to converge upon and clamp the shank of a tool inserted in the open center of the body.

4. A chuck of the type described, comprising a body having a central longitudinal bore extending therein from one end on the longitudinal axis of the body, and having inclined guideways converging upon the axis of the body from the same end, said guideways in each instance consisting of radially spaced curved surfaces, the inner of which is generated upon a greater radius than the outer and the said inner bores overlapping both the outer bores and the central bores, jaws movable in said respective inclined guideways, said jaws being composed of sections the outer of which is substantially completely circular and the inner of which is substantially semi-circular, spring means disposed under the bases of the jaws for urging the jaws in a direction forwardly of said body in their respective guideways and means screwed on the body for forcing the jaws rearwardly in their respective guideways and causing them to clamp the shank of a tool disposed within said central bore.

ALBERT C. KOETT.